(12) United States Patent
Memory (10) Patent No.: US 7,743,719 B2
(45) Date of Patent: Jun. 29, 2010

(54) SECTIONAL DISTRIBUTION OF GRANULAR PRODUCT

(75) Inventor: Russell James Memory, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/271,618

(22) Filed: Nov. 14, 2008

(65) Prior Publication Data

US 2010/0122644 A1    May 20, 2010

(51) Int. Cl.
*A01C 7/00* (2006.01)
*A01C 9/00* (2006.01)
*A01C 15/00* (2006.01)

(52) U.S. Cl. .................. 111/175; 111/200; 111/900; 111/925

(58) Field of Classification Search .......... 111/170, 111/174, 175, 186–188, 200, 900, 903, 904, 111/925
See application file for complete search history.

(56) References Cited

U.S. PATENT DOCUMENTS

| | | |
|---|---|---|
| 524,474 A | 8/1894 | Wade |
| 670,534 A | 3/1901 | Carmical |
| 1,369,649 A | 2/1921 | Gieseler |
| 2,062,295 A | 12/1936 | Cary et al. |
| 2,171,205 A | 8/1939 | Zinke |
| 2,193,738 A | 3/1940 | Perrin |
| 2,559,183 A | 7/1951 | Barnett |
| 2,671,690 A | 3/1954 | Von Ehrenkrook |
| 2,814,531 A | 11/1957 | Murray, Jr. |
| 2,937,049 A | 5/1960 | Osawa |
| 3,197,261 A | 7/1965 | Kauffman |
| 3,207,560 A | 9/1965 | Brown |
| 3,376,897 A | 4/1968 | Dolder et al. |
| 3,386,474 A | 6/1968 | Kimmel |
| 3,387,895 A | 6/1968 | Hochmuth et al. |
| 3,515,315 A | 6/1970 | Kidd |
| 3,543,704 A | 12/1970 | Hansen |
| 3,548,765 A | 12/1970 | Grataloup |
| 4,036,408 A | 7/1977 | Dugge |
| 4,082,364 A | 4/1978 | Krambrock |
| 4,200,412 A | 4/1980 | Steele |
| 4,244,522 A | 1/1981 | Hartwig |
| 4,264,243 A | 4/1981 | Bentzen-Bilkvist |
| 4,280,419 A | 7/1981 | Fischer |
| 4,379,664 A | 4/1983 | Klein et al. |
| 4,413,935 A | 11/1983 | Smith et al. |
| 4,506,704 A | 3/1985 | Boom et al. |
| 4,553,882 A | 11/1985 | Knappertz |
| 4,562,779 A | 1/1986 | Briggs |

(Continued)

FOREIGN PATENT DOCUMENTS

BR    9501580-9 A    11/1995

(Continued)

*Primary Examiner*—Christopher J. Novosad
(74) *Attorney, Agent, or Firm*—Rebecca Henkel (57) ABSTRACT

The present invention provides an agricultural implement and a method of making an agricultural implement. The agricultural implement has a primary containment unit and a plurality of sections. At least one dense phase delivery line connects the primary containment unit to each of the sections. A transport control system allows for individual control of the dense phase transport of the granular product from the primary containment unit to each of the plurality of sections via the at least one dense phase delivery line.

18 Claims, 6 Drawing Sheets

U.S. PATENT DOCUMENTS

| | | | |
|---|---|---|---|
| 4,674,922 A | 6/1987 | Federhen et al. |
| 4,738,770 A | 4/1988 | Hastings et al. |
| 4,779,765 A | 10/1988 | Neumeyer |
| 4,793,743 A | 12/1988 | Grodecki et al. |
| 4,843,983 A | 7/1989 | Olson |
| 4,872,785 A | 10/1989 | Schrage et al. |
| 5,033,914 A | 7/1991 | Wuertele et al. |
| 5,069,583 A | 12/1991 | Caldwell |
| 5,156,102 A | 10/1992 | Andersen |
| 5,161,473 A | 11/1992 | Landphair et al. |
| 5,240,355 A | 8/1993 | Hudalla |
| 5,379,706 A | 1/1995 | Gage et al. |
| 5,392,722 A | 2/1995 | Snipes et al. |
| 5,407,305 A | 4/1995 | Wallace |
| 5,494,381 A | 2/1996 | Heyl et al. |
| 5,575,225 A | 11/1996 | Smith et al. |
| 5,749,682 A | 5/1998 | Epting |
| 5,813,801 A | 9/1998 | Newbolt et al. |
| 5,878,679 A | 3/1999 | Gregor et al. |
| 5,927,217 A | 7/1999 | Halford et al. |
| 6,047,652 A | 4/2000 | Prairie et al. |
| 6,253,693 B1 | 7/2001 | Mayerle et al. |
| 6,298,797 B1 | 10/2001 | Mayerle et al. |
| 6,308,645 B1 | 10/2001 | Newkirk et al. |
| 6,308,646 B1 | 10/2001 | Luxon |
| 6,311,727 B1 | 11/2001 | Campau |
| 6,343,896 B1 | 2/2002 | Goodier et al. |
| 6,499,413 B2 | 12/2002 | Kleinknecht et al. |
| 6,505,569 B1 | 1/2003 | Richard |
| 6,581,532 B1 | 6/2003 | Hagen et al. |
| 6,584,919 B2 | 7/2003 | McQuinn |
| 6,644,225 B2 | 11/2003 | Keaton |
| 6,648,558 B1 | 11/2003 | Shultz |
| 6,742,464 B1 | 6/2004 | Chiu |
| 6,782,835 B2 | 8/2004 | Lee et al. |
| 6,854,405 B2 | 2/2005 | Memory |
| 6,899,042 B1 | 5/2005 | Kowalchuk |
| 6,904,851 B2 | 6/2005 | Memory |
| 6,928,938 B2 | 8/2005 | Memory |
| 6,928,939 B1 | 8/2005 | Johnson et al. |
| 6,935,254 B2 | 8/2005 | Ostrander et al. |
| 7,017,502 B2 | 3/2006 | Quam et al. |
| 7,040,242 B2 | 5/2006 | Memory |
| 7,048,475 B2 | 5/2006 | Cloue et al. |
| 7,101,120 B2 | 9/2006 | Jurkovich |
| 7,213,525 B2 | 5/2007 | Meyer et al. |
| 7,267,061 B2 | 9/2007 | Mayerle |
| 7,270,064 B2 | 9/2007 | Kjelsson et al. |
| 2006/0243179 A1 | 11/2006 | Landphair et al. |
| 2007/0022928 A1 | 2/2007 | Kowalchuk |
| 2007/0181048 A1 | 8/2007 | Pleyer |

FOREIGN PATENT DOCUMENTS

| | | |
|---|---|---|
| DE | 3528301 A1 | 2/1987 |
| DE | 19620016 A1 | 11/1997 |
| DE | 10006811 A1 | 1/2001 |
| EP | 0331302 A1 | 6/1989 |
| GB | 2064021 A | 6/1981 |
| GB | 2096085 A | 10/1982 |
| GB | 2222131 A | 2/1990 |
| JP | 61111227 A | 5/1986 |
| JP | 01013311 A | 1/1989 |
| JP | 06092454 A | 4/1994 |
| JP | 2003070329 A | 3/2003 |
| JP | 2003081425 A | 3/2003 |

SECTIONAL DISTRIBUTION OF GRANULAR PRODUCT

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

This invention relates to agricultural implements. In particular, this invention relates to sectional distribution of a granular product via dense phase transport.

A common problem in many agricultural implements is achieving acceptable sectional distribution of a granular product. It is often desirable for a granular product such as seed or fertilizer to be transported from a central containment unit to a number of spaced apart secondary units. In this way, the granular product can be more easily spread over a large area.

In most agricultural implements, individual grains are pneumatically transported from a central containment unit to a number of secondary containment units. This transport is conventionally performed at a low ratio of the granular product to air. As there is relatively little granular product being transported by a large amount of air, such transport is also known as dilute phase transport.

Such transport is imperfect, however. Often, one of the secondary containment units receives too much or not enough of the granular product. Delivery of too much or not enough product may occur for a number of reasons including variable rates for precision farming, usage at point rows, variations in the metering and distribution at the secondary containment units, the secondary containment units having various sized container volumes, and the like. Thus, there is frequently a need to selectively increase or decrease the rate of feeding from the primary containment unit to the individual secondary containment units.

However, it is difficult to achieve much control in the section distribution of seed using conventional transport. Once the granular product is introduced into the delivery line, it is sent directly to the secondary containment unit. The granular product cannot be stopped mid-line. An inline valve cannot be used to stop the flow of the granular product mid-line because a closed valve would result in a localized accumulation of the granular product at the valve, clogging the line and preventing further transport of the seed. Thus, existing systems are not well-suited for controlling or regulating the flow of granular product to each of the secondary units individually.

Hence, there is a need for an improved way to distribute a granular product from a central containment unit to a plurality of secondary units. In particular, there is a need for a way to distribute a granular product such that the transport of the granular product to each of the secondary containment units can be individually controlled.

SUMMARY OF THE INVENTION

The present invention provides an agricultural implement for distributing a granular product. The agricultural implement includes a primary containment unit for holding and dispensing the granular product and a plurality of sections for secondary containment of the granular product. At least one dense phase delivery line runs from the primary containment unit to each of the plurality of sections. Each of the dense phase delivery lines have a valve near an end of the dense phase delivery line proximate each of the plurality of sections. The agricultural implement further includes a transport control system including a conveying mechanism and a controller. The conveying mechanism is configured to transport the granular product from the primary containment unit to each of the plurality of sections. The controller is configured to separately open and close the valves to control a flow of the granular product from the at least one dense phase delivery line into each of the plurality of sections. The transport control system allows for individual control of dense phase transport of the granular product from the primary containment unit to each of the plurality of sections via the at least one dense phase delivery line.

According to one aspect of the invention, the conveying mechanism is a pneumatic device.

According to another aspect of the invention, the conveying mechanism is an auger.

According to still yet another aspect of the invention, the controller includes a sensor in each of the plurality of sections. The sensor is configured to determine a condition relating to the amount of the granular product in the section so that the controller can open or close the corresponding valve for the section.

According to another aspect of the invention, the granular product is at least one of seed and fertilizer.

According to yet another aspect of the invention, each of the plurality of sections separately includes a containment reservoir for containment of the granular product, a meter for metering the granular product, and a distributor for distributing for the granular product.

According to still yet another aspect of the invention, at least one dense phase delivery line includes a plurality of dense phase delivery lines for each of the plurality of sections. Each of the plurality of dense phase delivery lines are connected at an inlet to the primary containment unit and have an outlet at a corresponding section.

According to another aspect of the invention, at least one dense phase delivery line has a single inlet connected to the primary containment unit and a split to form a plurality of branches. Each of the plurality of branches have an outlet at a corresponding section. A separate valve is near an end of each of the plurality of branches.

According to one aspect of the invention, the controller is configured to open at most only one of the valves at a time for the at least one dense phase delivery line.

According to still yet another aspect of the invention, at least one of the plurality of sections is at atmospheric pressure.

According to another aspect of the invention, the primary containment unit is closed to a surrounding atmosphere and has a pressure above atmospheric pressure. Further, the primary containment unit has a greater pressure than each of the plurality of sections.

The present invention also provides a method of making an agricultural implement. A primary containment unit and a plurality of sections are provided. At least one dense phase delivery line is run from the primary containment unit to each of the plurality of sections. A valve is provided near an end of the at least one dense phase delivery line proximate each of the plurality of sections. A transport control system is provided to the agricultural implement including a conveying mechanism and a controller. The conveying mechanism is configured to transport a granular product in dense phase from the primary containment unit to each of the plurality of sections. The controller is configured to open and close the valve near the end of the at least one dense phase delivery line.

According to one aspect of the invention, the conveying mechanism is a pneumatic device.

According to another aspect of the invention, the conveying mechanism is an auger.

According to still another aspect of the invention, the controller includes a sensor in each of the plurality of sections. The sensor is configured to determine a condition relating to the amount of the granular product in the section so that the controller can open or close the corresponding valve for the section.

According to yet another aspect of the invention, each of the plurality of sections separately includes a containment reservoir for containment of the granular product, a meter for metering the granular product, and a distributor for distributing for the granular product.

According to another aspect of the invention, at least one dense phase delivery line includes a plurality of dense phase delivery lines for each of the plurality of sections. Each of the plurality of dense phase delivery lines are connected at an inlet to the primary containment unit and have an outlet at a corresponding section.

According to yet another aspect of the invention, at least one dense phase delivery line has a single inlet connected to the primary containment unit and a split to form a plurality of branches. Each of the plurality of branches have an outlet at a corresponding section.

According to another aspect of the invention, at least one of the plurality of sections has an open top and an outlet on at least one dense phase delivery line is positioned over the open top.

According to yet another aspect of the invention, at least one of the plurality of sections has a covered top and an interior volume. An outlet on at least one dense phase delivery line is connected and in communication with the section when the corresponding valve is open.

These and still other advantages of the invention will be apparent from the detailed description and drawings. What follows is merely a description of a preferred embodiments of the present invention. To assess the full scope of the invention the claims should be looked to as the preferred embodiments are not intended to be the only embodiments within the scope of the claims.

DETAILED DESCRIPTION OF THE PREFERRED EMBODIMENTS

The following applications, each having a filing date of Nov. 14, 2008, are hereby incorporated by reference as if fully set forth herein: U.S. application Ser. No. 12/271,679 ("Agricultural Implement with Dense Phase Product Flow from a Primary Container"); U.S. application Ser. No. 12/271,723 ("Device and Method for Dense Phase Transport of Seed"); U.S. application Ser. No. 12/271,745 ("Agricultural Implement with Dense Phase Product Dispensing and Purging"); U.S. application Ser. No. 12/271,765 ("Valve and Method for Dense Phase Flow Control"); U.S. application Ser. No. 12/271,787 ("Dense Phase Distribution Branch"); U.S. application Ser. No. 12/271,808 ("Pressure Supply Assembly for an Agricultural Implement with Dense Phase Product Flow"); U.S. application Ser. No. 12/271,816 ("Dense Phase Induction System and Method"); and U.S. application Ser. No. 12/271,822 ("Granular Containment Assembly and Method").

Figure 1:
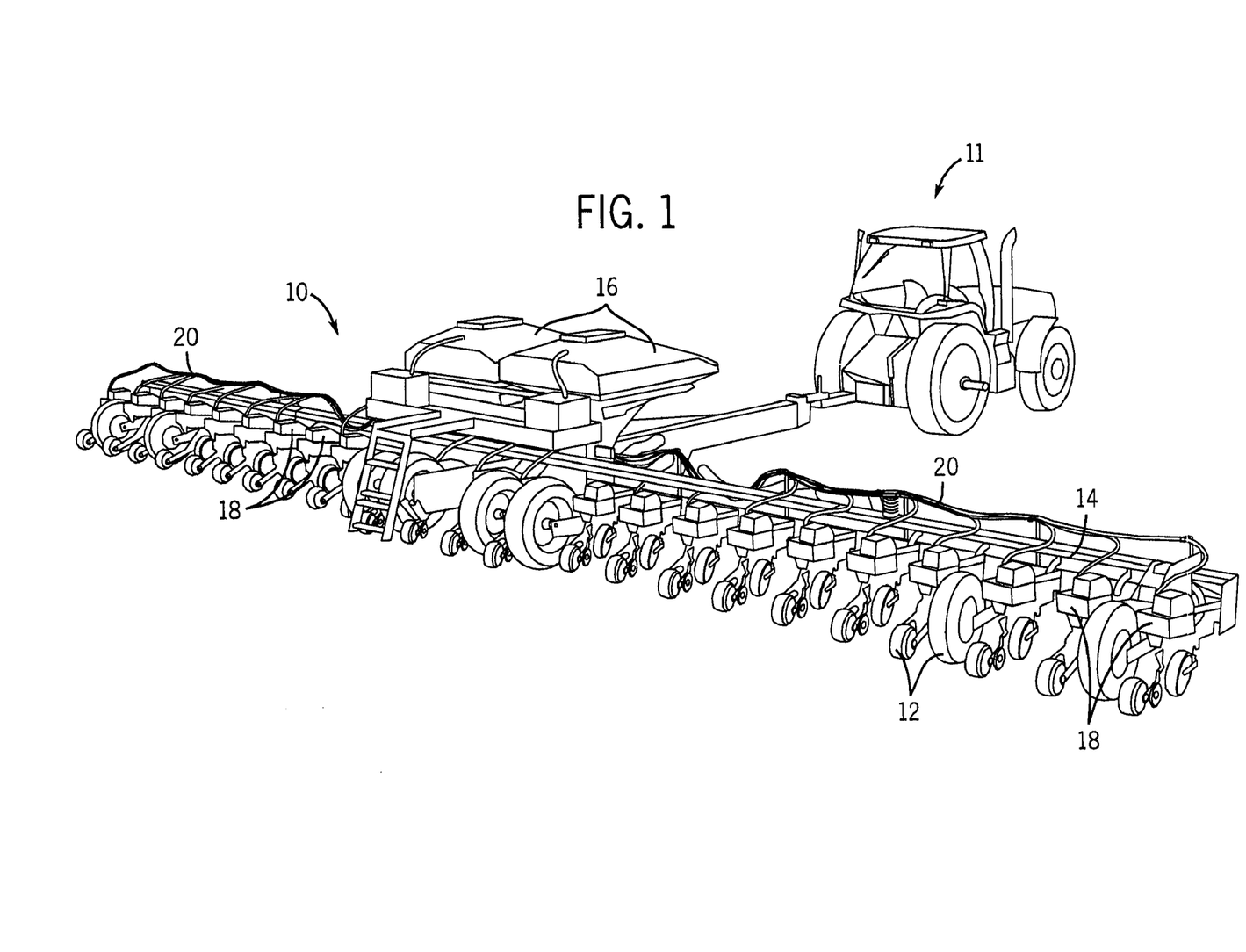
FIG. 1 is a perspective view of the agricultural implement and a tractor according to the present invention.

Referring now to FIG. 1, an agricultural implement 10 is shown for the distribution of a granular product such as seed, fertilizer, and the like. The agricultural implement 10 may be pulled behind a tractor 11. Wheels 12 are mounted to a frame 14 to make pulling the agricultural implement 10 across the ground easier.

Figure 2:
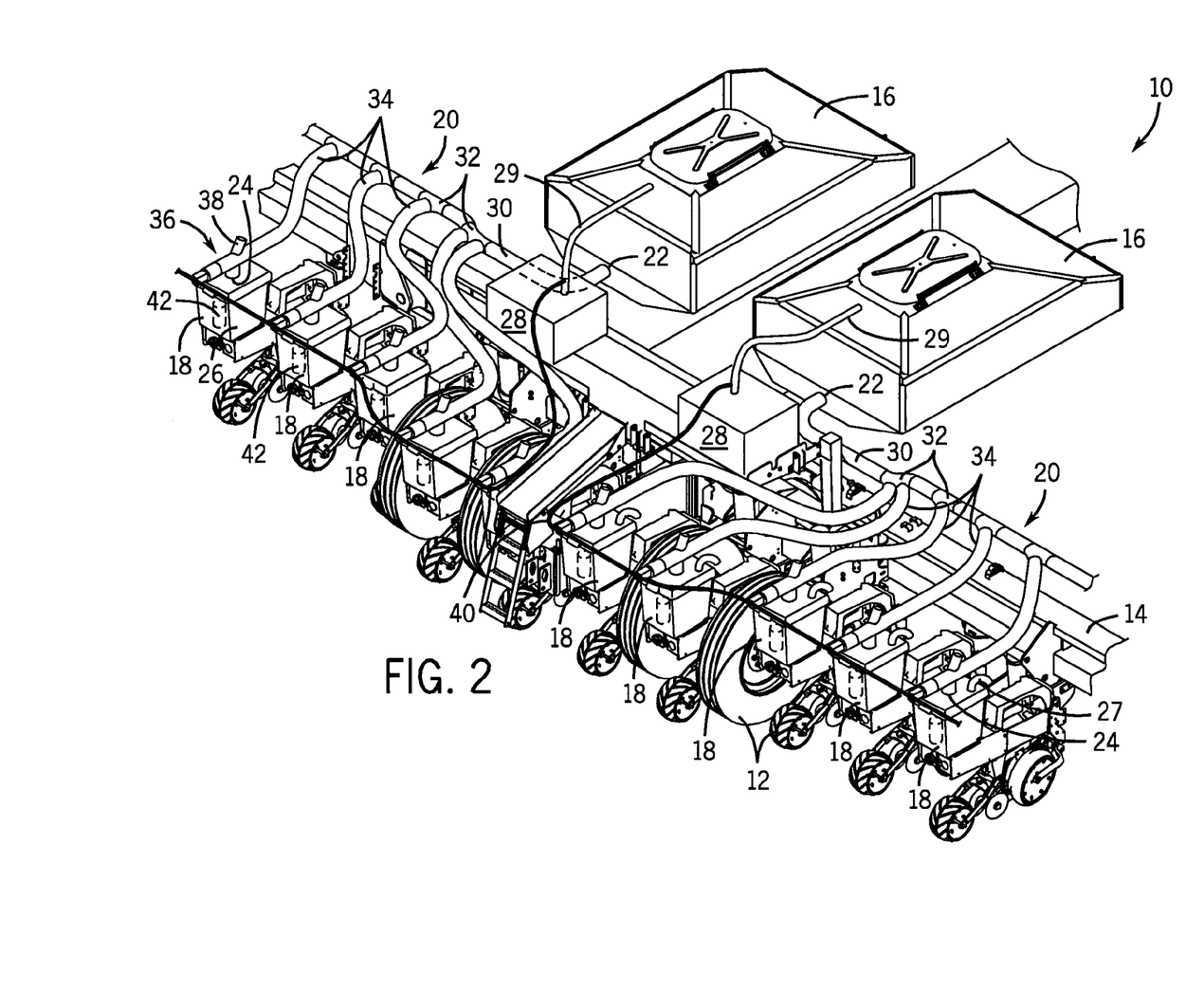
FIG. 2 is a perspective view of an agricultural implement according to the present invention.

Referring now to FIG. 2, on the frame 14, the agricultural implement 10 has two primary containment units 16 for holding and dispensing the granular product and a plurality of sections 18 for the secondary containment of the granular product. The dense phase delivery lines 20 each have an inlet 22 that connects to one of the primary containment units 16 and one or more outlets 24 that connect to each of the sections 18. The dense phase delivery lines 20 place the primary containment units 16 and each of the sections 18 in communication with one another and are used to transport the granular product from the primary containment unit 16 to the sections 18.

Generally, the agricultural implement 10 is designed such that the primary containment units 16 hold large amounts of the granular product which is to be distributed to each of the sections 18 for temporary containment, metering, and distribution during to seeding, fertilizing or the like. The plurality of sections each separately include a containment reservoir 26 for containment of the granular product, a meter for metering the granular product, and a distributor for distributing the granular product. The top of the sections 18 also have a vent 27 that permit any excess air to escape from the top of the section 18. This vent 27 vents air from each of the corresponding sections 18 such that the sections 18 may remain at, or only slightly above, atmospheric pressure.

A conveying mechanism, such as a pressure supply 28, is used to provide the necessary force to transport the granular product from the primary containment units 16 to each of the sections 18 via the dense phase delivery lines 20. The pressure supply 28 is connected to the primary containment units 16 via a hose 29. In other embodiments, the conveying mechanism may be a pneumatic device, an auger, or the like. In any case, the conveying mechanism must be capable of supplying the necessary motive force for transporting the granular product in dense phase.

In the form shown in FIG. 2, the flow of granular product is driven pneumatically, using pressurized air from the pressure supplies 28. These pressure supplies 28 provide constant pressurized air to the primary containment units 16, raising the pressure in the primary containment units 16. As the pressure in the primary containment units 16 increases, a pressure differential occurs between the primary containment units 16 and the sections 18 causing the air from the primary containment units 16 to move through the dense phase delivery lines 20 and into the sections 18 that have an open pathway to them. As the air moves from the primary containment unit 16 to the sections 18, it transports some of the granular product in dense phase.

As used herein, dense phase refers to the transport of a granular product when the mass flow ratio (the mass of product to the mass of air) exceeds 50. Preferably, the mass flow ratio exceeds this value. It is contemplated that the granular product will typically occupy a large volume percent of any passage that it is being conveyed through. Preferably, the granular product substantially fills the passageway of the dense phase lines, with only minimal space between the individual grains of the granular product.

Returning now to the structure of the dense phase delivery line 20, the dense phase delivery line 20 includes a root portion 30 that includes one or more splits 32. Each of these splits 32 divides the dense phase delivery line 20 to form a plurality of branches 34 downstream of the splits 32. Each of these branches 34 extend to one of the sections 18. In this way, there is a pathway from the primary containment unit 16 to each of the sections 18.

It should be appreciated that while the dense phase delivery lines 20 are shown as being branched, the dense phase delivery lines 20 may have alternative configurations to dispense the granular product to each of the sections 18. For instance, in one form, the dense phase delivery lines 20 may be individual lines each having a single inlet connected to the primary containment unit 16 and an single outlet connected to one of the sections 18.

Proximate the outlets 24 of each end of the dense phase delivery branches 34 is a valve 36. The valve 36 includes a piston having a plunger at the end thereof that can be forced into the dense phase delivery line 20 proximate the outlet 24 to block the dense phase flow through the associated branch 34. When the plunger is actuated into the an associated branch and a diaphragm on the end of the plunger is inflated, granular product is forced back in the branch 34 and into a surge chamber 38. Notably, the plunger is driven into a bend of the branch 34 such that the head of plunger and the diaphragm drive the granular product back and up into the surge chamber 38 while the sides of the plunger block a downward portion of the branch 34 near the outlet 24. Although, one type of valve has been described, other configurations suitable for starting and stopping dense phase flow could also be employed.

The valves 36 at the end of each of the branch 34 can be individually actuated to start or stop the flow of the granular product through each of the branches 34.

As shown in FIG. 2, the valves 36 may be actuated pneumatically via a valve air line 40. However, the valves 36 may be driven in any number of ways including other standard mechanical and electrical forms of actuation. As will be described in more detail below, this individual control over sectional distribution can be used to preferentially feed some of the sections 18 while blocking flow to other sections 18.

Inside each of the sections 18 is a sensor 42. The sensor 42 is configured to determine a condition relating to the amount of the granular product in the section 18. The sensor 42 may detect a quantity of granular product in the section 18 or may detect whether or not the granular product exceeds some threshold value in height, weight, or other identifiable quality. It is contemplated that the sensor 42 could be mechanical, optical, pressure-sensitive, and the like.

Referring now to FIGS. 5-8, a controller 44 is configured to separately open and close the valves 36 to individually control a flow of the granular product from the branches 34 to each of the sections 18. The controller 44 may monitor each of the sensors 42 via a wired connection 46 or wireless connection to determine the amount of granular product in each of the corresponding sections 18. If the sensor 42 detects low levels of granular product in the section 18, then the controller 44 may open the corresponding valve 36 to allow the flow of granular product into the section 18. If the sensor 42 detects high levels of granular product in the section 18, then the controller 44 may close the corresponding valve 36 to discontinue the flow of granular product into the section 18.

It should be appreciated that the controller 44 could be programmed with various logical conditions for the opening and closing of the valves 36. For example, the controller 44 may keep each valve 36 closed unless the amount of granular product drops below a certain level. Once the amount of granular product drops below this level, the controller 44 may open the valve 36 to fill the corresponding section 18 for a specified period of time or until the amount of product in the section 18 exceeds a certain level.

Figure 5:
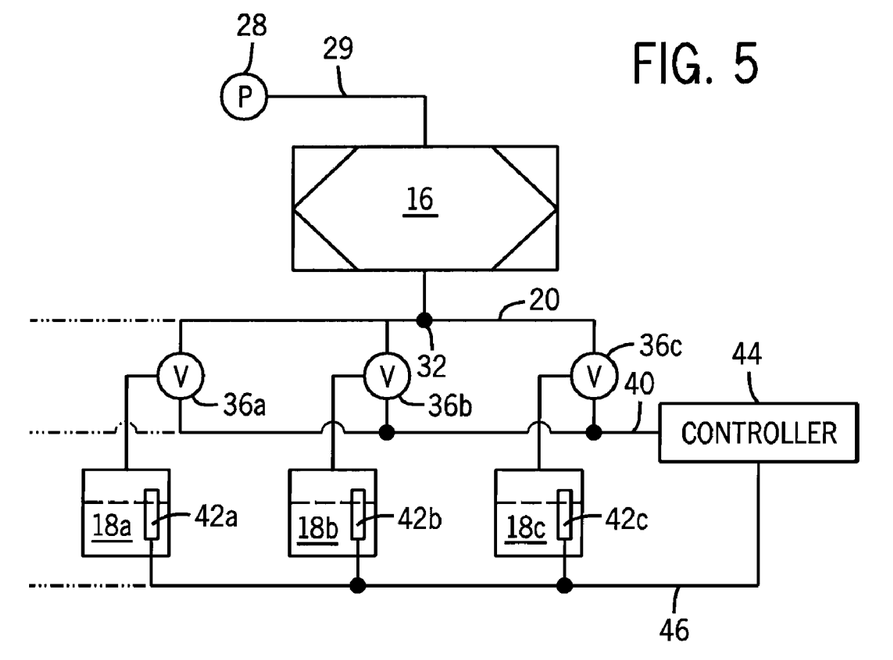
FIGS. 5-8 are schematic representations of the dense phase delivery lines and valves used during the operation of the present invention.

Referring now to FIG. 5, a schematic is shown in which all of the sections 18a-c have some granular product (the height of the granular product is indicated by the dashed lines). In FIG. 5, all of the sections 18a-c are sensed to have sufficient amounts of granular product in them, and thus the controller 44 has closed all of the valves 36a-c.

Figure 6:
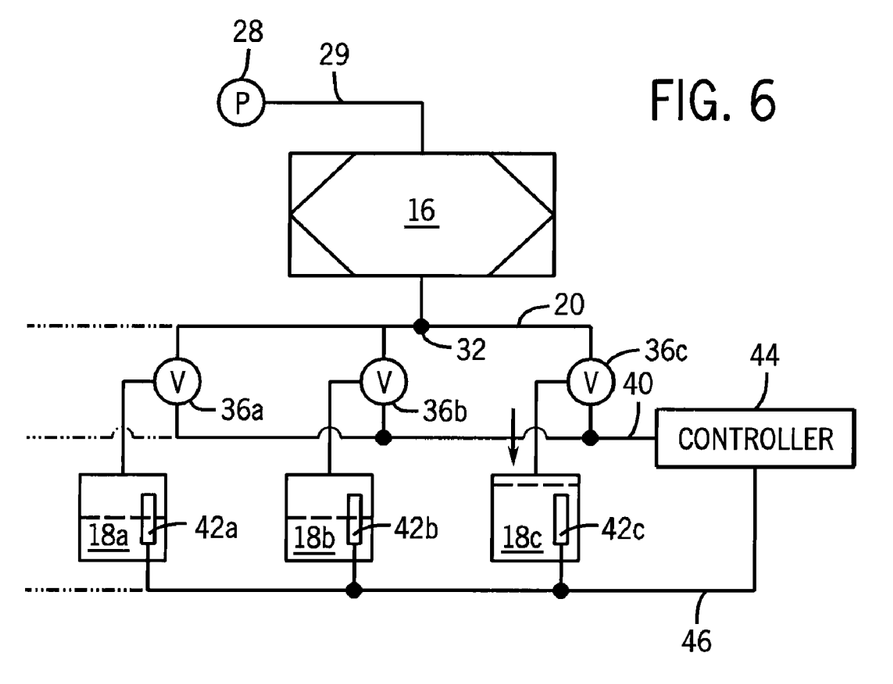
Figure 7:
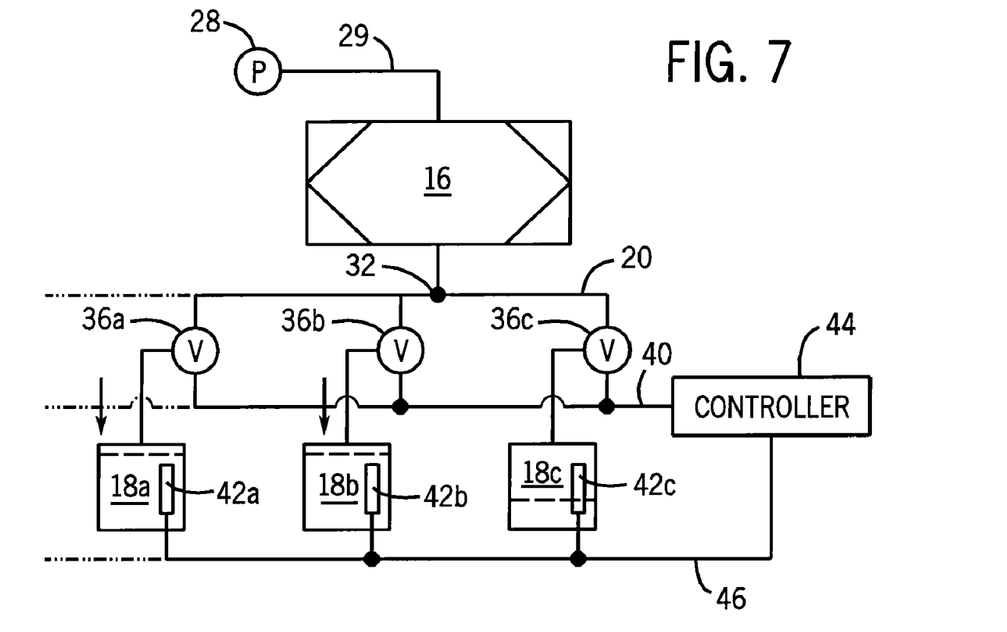
Figure 8:
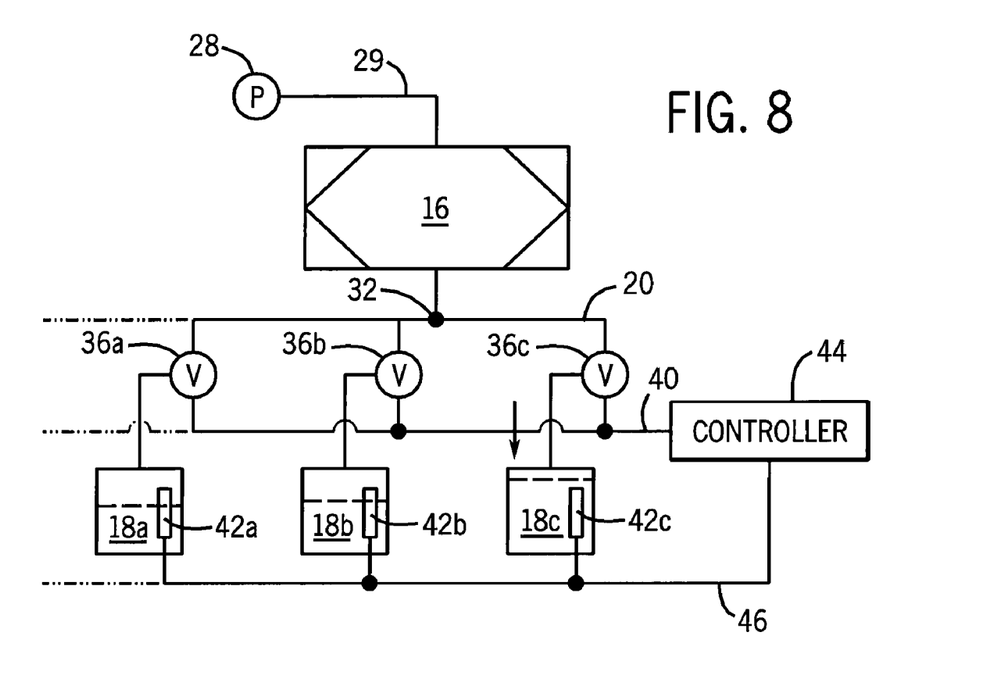

In FIG. 6, the levels in all of the sections 18a-c have lowered as a result of use. However, the levels in sections 18a and 18b have been lowered more quickly than the level in 18c. Accordingly in FIG. 7, valves 36a and 36b are opened to allow the refill of sections 18a and 18b after sensors 42a and 42b sensed that these sections were too low. During this process, valve 36c remains shut as the level in 36c was sensed by sensor 42c to be high enough to not require refill. However, as the levels continue to decrease, the level in 36c will be sensed to be too low, at which time the valve 36c is opened and section 18c is separately refilled as shown in FIG. 8.

Preferably, the controller 44 is programmed such that no more than one of the end-of-line valves are open at a time for a given pressurized system. Since the granular product only moves when the air velocity exceeds a level necessary to transport the product, there is the risk that if more than one of the end-of-line valves are open at the same time, that the air may flow through the open branches 34 at a velocity that is insufficient to transport the granular product.

To avoid this problem, the sensors 42 can be designed to inform to the controller 44 when the level of granular product is low, but not yet at a critical level. If multiple sections 18 are approaching an empty level at the same time, then the controller 44 can open a first valve to a first section that is sensed to be most in need of the granular product. The controller 44 may only partially fill this first section before closing the first valve and then opening a second valve to supply the granular product to a second section that is also in immediate need of more granular product. The switch from the first section to the second section may be based on a specific time or may be based on real-time sensing of the level of granular product in each of the sections. After the second section is full, the controller 44 may then close the second valve and reopen the first valve to continue replenishing the supply of granular product in the first section. This type of timing operation could be performed with two or more sections to effectively maintain acceptable levels in all the sections without letting one of the sections reach an empty state. Thus, the controller 44 can time the refilling of the sections 18 such that no more than one valve 34 needs to be open at a time.

Figure 3:
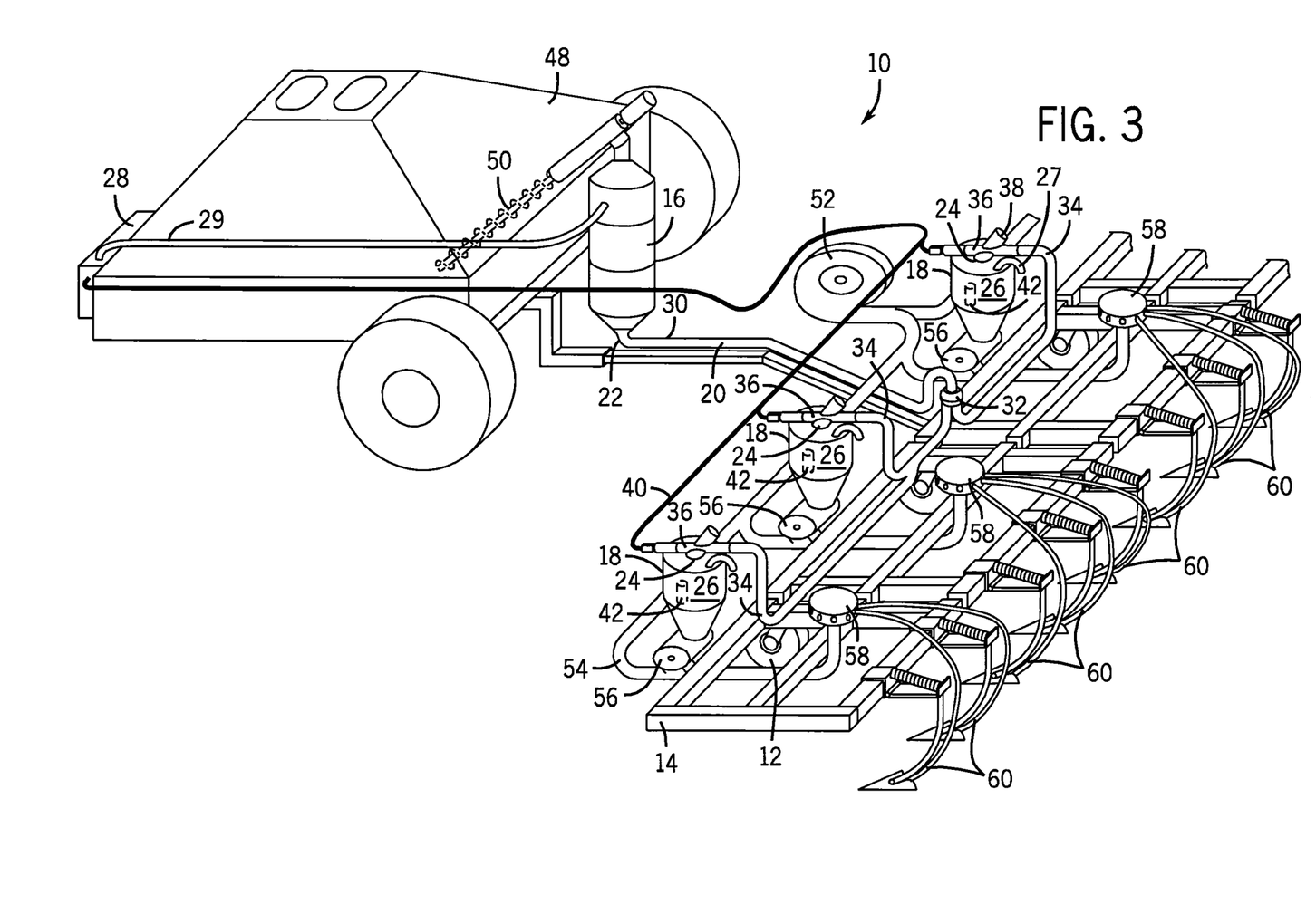
FIG. 3 is a perspective view of another agricultural implement according to the present invention having an additional dilute phase distribution stage.

Referring now to FIG. 3, a variation on the agricultural implement 10 is shown. In this form, the primary containment unit 16 is smaller than in the form shown in FIG. 2. A large hopper 48 holds the bulk of the granular product and is transferred via an auger 50 into the primary containment unit 16.

One benefit of this arrangement is that with a smaller primary containment unit 16, less pressurized air from the pressure supply 28 is required to charge the primary containment unit 16. In contrast, a large primary containment unit requires more pressurized air to create an initial pressure differential. Delivery from the primary containment unit 16 to the secondary containment units 18 is as described above with respect to FIG. 2.

Additionally, the agricultural implement 10 in FIG. 3 incorporates a dilute phase transport of granular product from each of the sections 18. A dilute phase air supply 52 provides air to a series of distribution tubes 54 that receive the granular product from metering devices 56 on the bottom of each of the sections 18. After the granular product is metered into the distribution tubes 54, the granular product is pneumatically transported to a dilute phase delivery device 58 that has product distribution lines 60.

Figure 4:
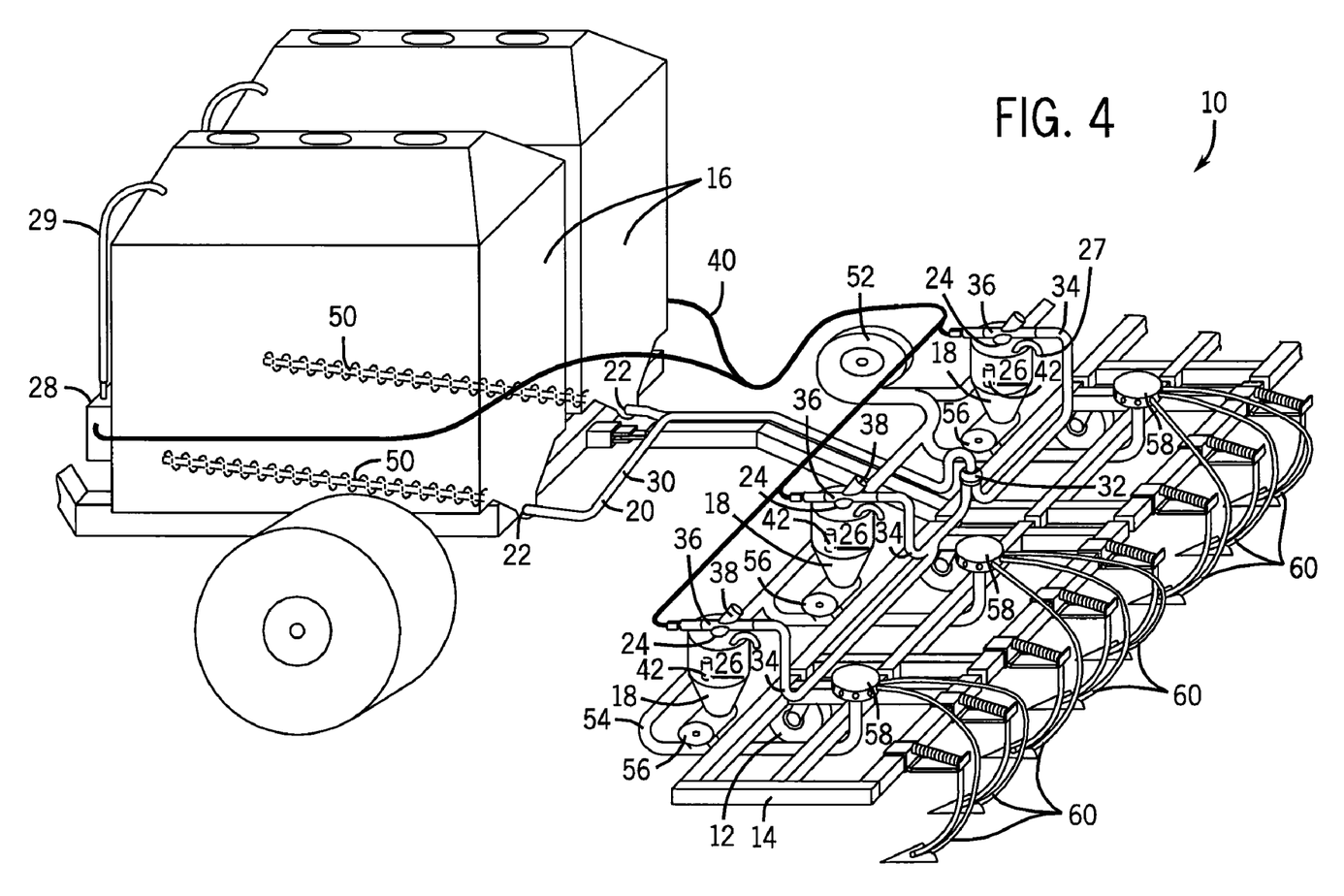
FIG. 4 is a perspective view of still another agricultural implement according to the present invention with auger-assisted feeding.

Referring now to FIG. 4, yet another form of the agricultural implement 10 is provided in which the primary containment tanks 16 are pressurized and augers 50 assist in the transport of the product from the primary containment units 16 into the dense phase delivery lines 20. Other delivery components in FIG. 4 are similar to the components shown in FIG. 3.

Thus, the present invention provides an agricultural implement that is capable of dense phase transport and sectional distribution. Each of the sections or secondary containment units can be individually fed depending on the level of granular product in the section or other conditions. Further, when it is desirable, this sectional distribution by dense phase transport can be combined with dilute phase transport for metering and distribution of the granular product.

Many modifications and variations to these preferred embodiments will be apparent to those skilled in the art, which will be within the spirit and scope of the invention. Therefore, the invention should not be limited to the described embodiments. To ascertain the full scope of the invention, the following claims should be referenced.

INDUSTRIAL APPLICABILITY

The present invention provides an agricultural implement that can individually feed a granular product to a number of different sections or secondary containment units via dense phase transport.

What is claimed is:

1. An agricultural implement for distributing a granular product, the agricultural implement comprising:
   at least one ground engaging member for impacting the ground;
   a primary containment unit for holding and dispensing the granular product;
   a plurality of sections for secondary containment of the granular product;
   at least one dense phase delivery line running from the primary containment unit to each of the plurality of sections, each of the at least one dense phase delivery lines having a valve at an end of the at least one dense phase delivery line proximate each of the plurality of sections; and
   a transport control system including a conveying mechanism and a controller, the conveying mechanism configured to transport the granular product from the primary containment unit to each of the plurality of sections and the controller configured to separately open and close the valves to control a flow of the granular product from the at least one dense phase delivery line into each of the plurality of sections;
   wherein the transport control system allows for individual control of dense phase transport of the granular product from the primary containment unit to each of the plurality of sections via the at least one dense phase delivery line, wherein each of the plurality of sections separately includes a containment reservoir for containment of the granular product, a meter for metering the granular product, and a distributor for distributing the granular product.

2. The agricultural implement of claim 1 wherein the conveying mechanism is a pneumatic device.

3. The agricultural implement of claim 1 wherein the conveying mechanism is an auger.

4. The agricultural implement of claim 1 wherein the controller includes a sensor in each of the plurality of sections, the sensor configured to determine a condition relating to the amount of the granular product in the section so that the controller can open or close the corresponding valve for the section.

5. The agricultural implement of claim 1 wherein the granular product is at least one of seed and fertilizer.

6. The agricultural implement of claim 1 wherein the at least one dense phase delivery line includes a plurality of dense phase delivery lines for each of the plurality of sections, each of the plurality of dense phase delivery lines connected at an inlet to the primary containment unit and having an outlet at a corresponding section.

7. The agricultural implement of claim 1 wherein the at least one dense phase delivery line has a single inlet connected to the primary containment unit, the at least one dense phase delivery line including a split to form a plurality of branches, each of the plurality of branches having an outlet at a corresponding section and wherein there is a separate valve near an end of each of the plurality of branches.

8. The agricultural implement of claim 7, wherein the controller is configured to open at most only one of the valves at a time for the at least one dense phase delivery line.

9. The agricultural implement of claim 1 wherein at least one of the plurality of sections is at atmospheric pressure.

10. The agricultural implement of claim 1 wherein the primary containment unit is closed to a surrounding atmosphere and have a pressure above atmospheric pressure, the primary containment unit having a greater pressure than each of the plurality of sections.

11. A method of making an agricultural implement comprising:
   having at least on ground engaging member for impacting the ground;
   providing a primary containment unit and a plurality of sections;
   running at least one dense phase delivery line from the primary containment unit to each of the plurality of sections;
   providing a valve near an end of the at least one dense phase delivery line proximate each of the plurality of sections; and
   providing a transport control system to the agricultural implement including a conveying mechanism configured to transport a granular product in dense phase from the primary containment unit to each of the plurality of sections, the transport control system further including a controller configured to open and close the valve at the end of the at least one dense phase delivery line, wherein each of the plurality of sections separately includes a containment reservoir for containment of the granular product, a meter for metering the granular product, and a distributor for distributing the granular product.

12. The method of claim 11 wherein the conveying mechanism is a pneumatic device.

13. The method of claim 11 wherein the conveying mechanism is an auger.

14. The method of claim 11 wherein the controller includes a sensor in each of the plurality of sections, the sensor configured to determine a condition relating to the amount of the granular product in the section so that the controller can open or close the corresponding valve for the section.

15. The method of claim 11 wherein the at least one dense phase delivery line includes a plurality of dense phase delivery lines for each of the plurality of sections, each of the plurality of dense phase delivery lines connected at an inlet to the primary containment unit and having an outlet at a corresponding section.

16. The method of claim 11 wherein the at least one dense phase delivery line has a single inlet connected to the primary containment unit, the at least one dense phase delivery line including a split to form a plurality of branches, each of the plurality of branches having an outlet at a corresponding section.

17. The method of claim 11 wherein at least one of the plurality of sections has an open top and an outlet on the at least one dense phase delivery line is positioned over the open top.

18. The method of claim 11 wherein at least one of the plurality of sections has a covered top and an interior volume and an outlet on the at least one dense phase delivery line is connected and in communication with the section when the corresponding valve is open.

* * * * *